UNITED STATES PATENT OFFICE.

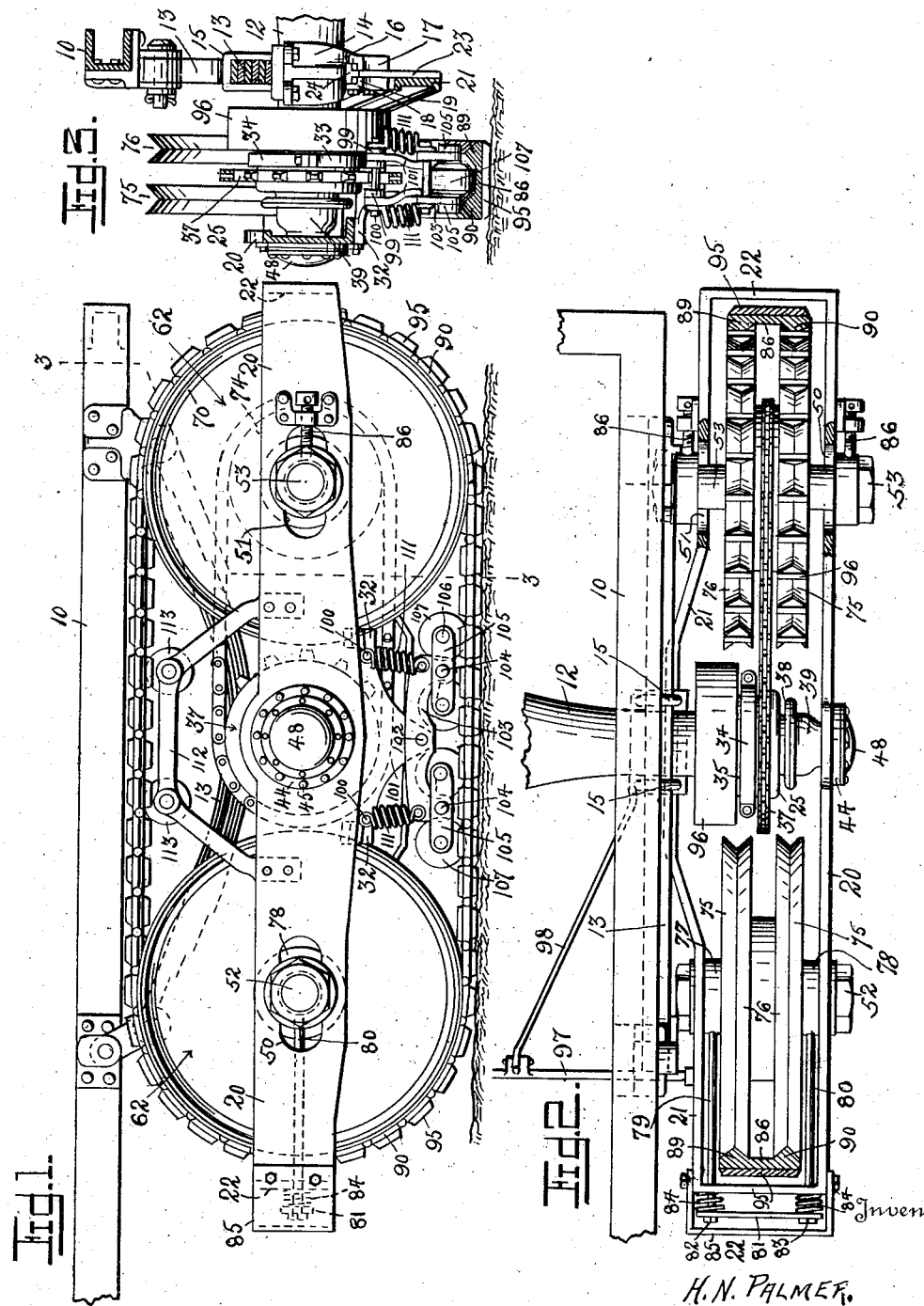

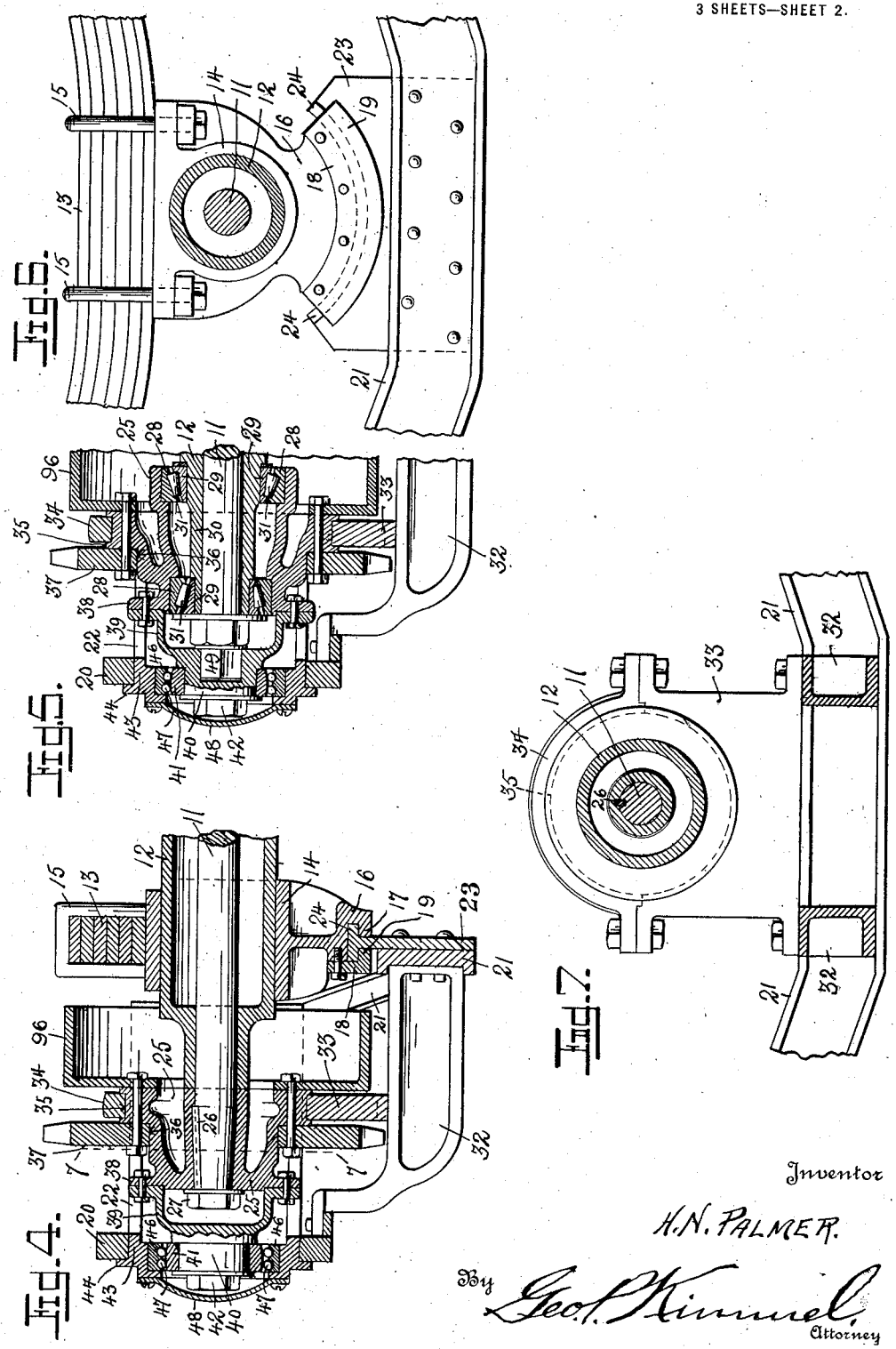

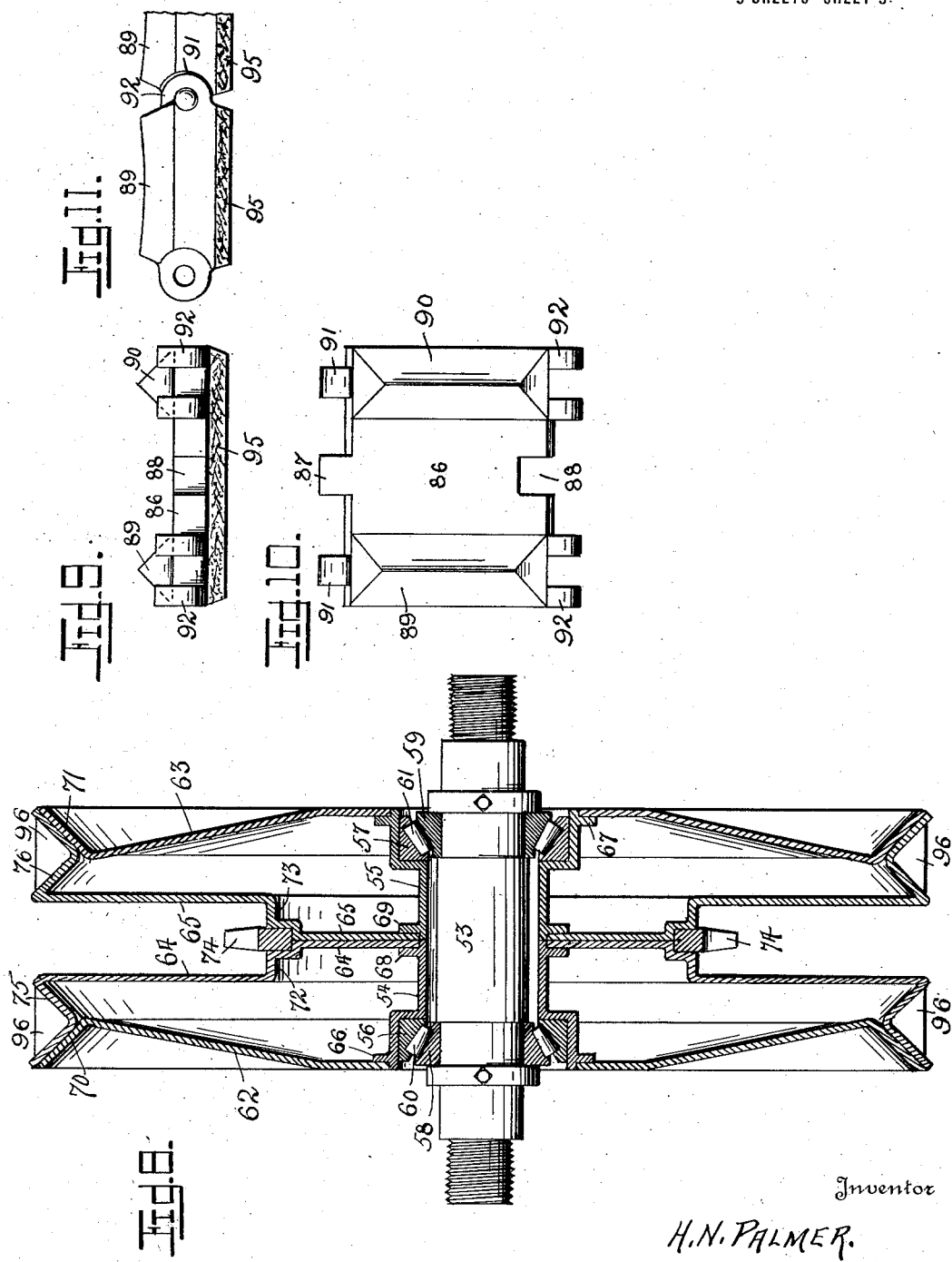

HAROLD N. PALMER, OF PUTNAM, CONNECTICUT.

TRACTOR ATTACHMENT.

1,388,750.  Specification of Letters Patent.  Patented Aug. 23, 1921.

Application filed March 4, 1920. Serial No. 363,166.

*To all whom it may concern:*

Be it known that I, HAROLD N. PALMER, a citizen of the United States, residing at Putnam, in the county of Windham and State of Connecticut, have invented certain new and useful Improvements in a Tractor Attachment, of which the following is a specification.

This invention relates to auto vehicles, and has for one of its objects to provide an attachment for vehicles of this class comprising continuous traction treads or endless tracks to replace the rear or driving wheels, to provide a longer supporting surface in engagement with the ground, to provide a traction surface of increased area which will effectually support the body of the vehicle and its load when running over soft ground, snow and the like, to materially decrease the wear upon the roads, and to correspondingly increase the load carrying qualities of the vehicle.

The improved attachment is adapted more particularly for use in connection with auto trucks for carrying heavy loads, but may be used without material structural change upon auto vehicles of various kinds, and it is not desired to limit the invention in any manner in this respect.

Figure 1 is a side elevation of one of the improved devices applied.

Fig. 2 is a plan view of the parts shown in Fig. 1 with the tread chain in transverse section.

Fig. 3 is a transverse section on the line 3—3 of Fig. 1.

Fig. 4 is an enlarged sectional detail of one of the axle bearings.

Fig. 5 is an enlarged sectional detail of one of the axle bearings illustrating a modification in the construction.

Fig. 6 is an enlarged detail of a portion of one of the springs and its swinging coupling means.

Fig. 7 is a transverse section on the line 7—7 of Fig. 4.

Fig. 8 is an enlarged sectional detail of one of the tread chain wheels.

Figs. 9, 10 and 11 are enlarged details of the combined chain tread and links.

A portion of the body or chassis of the truck is represented as a whole at 10 having the rear axle 11 supported in an axle housing 12, the latter coupled yieldably to the chassis by the usual springs, one of which is represented at 13.

Each of the springs 13 is coupled to the housing 12 by a boxing or bearing each including a body portion 14 having an opening to receive the housing and with a flat upper side to support the spring to which it is coupled by U-bolts 15. The improved attachment is applied to each side of the truck, or to each end of the axle, but as the attachments are alike except that certain parts are rights and lefts, the description of one will suffice for both. Depending from each boxing member 14 is a web 16 having a segmental lateral rib 17, the curvature of the rib being concentric to the surface of the axle and the housing.

Attached to each of the webs 16 is a clamp plate 18 having a lateral rib 19 curved to correspond to the curvature of the rib 17, the ribs 17 and 19 coacting to form a curved guideway concentric to the axle and its housing, the object to be hereafter explained.

Extending in a substantially horizontal position is an open frame formed of outer side 20, and inner side 21 preferably integral with end portions 22. The central portion of the side portion 21 of the frame is directed downwardly, and attached to the downwardly directed portion is a plate 23 having laterally directed curved ribs 24, corresponding to and slidably engaging in the guideway formed by the ribs 17 and 19. By this means the frame is mounted to swing relatively to the axle.

The connection between the journals of the axle 11 and the swinging frame may be of the form shown in Fig. 4 when a direct connection is required, or of the form shown in Fig. 5 when a "floating" type of connection is required.

When the form shown in Fig. 4 is employed the journals of the axle are slightly tapered and a hub member 25 is keyed or otherwise connected to turn with the axle, as shown at 26, and held from endwise movement by a clamp nut 27.

When the "floating" type of connection is employed annular wear members 28 and 29 are interposed between the hub 25 and an extension or sleeve 30 integral with housing 12, and antifriction rollers 31 disposed between the wear members.

Connecting the sides 20 and 21 of the swinging frame at spaced intervals, are transverse supports 32, and mounted upon each pair of these supports is a relatively large bearing formed of a base portion 33 bolted to the supports and a cap portion 34 bolted to the base member. The hub member 25 is provided with a journal 35 rotatably engaging the bearing members 33 and 34, and likewise provided with an annular shoulder 36 to receive an annular chain wheel 37.

At its outer end the hub 25 is formed with an outwardly directed flange 38, and attached to the flange is a covering cap 39.

Extending from the cap 39 is a journal 40, the latter having a wear ring 41 held in place by a clamp nut 42 upon the journal 40.

The outer frame member 20 is formed with a relatively large central opening in which an annular frame 43 is secured by an attaching flange 44 and clamp bolts 45. Fitting within the frame 43 is an opposing wear ring 46, the rings 41 and 46 having ball races to receive bearing balls 47.

By this means an effectual ball bearing joint is produced between the hub 25 and the outer frame member 20.

A covering cap 48 is attached to the outer face of the frame 43. When the floating type of connection is employed, the journal of the axle is extended as shown at 49, and the extended portion formed square or other form than round, and fitting in a correspondingly shaped socket in the cap member 39.

The side members 20 and 21 are provided with longitudinally directed slots 50 and 51, and slidably and rotatably engaging in these slots are short shafts 52 and 53. The shaft 52 carries a pair of tread chain carrying wheels in spaced relation, while the shaft 53 carries a similar pair of tread chain carrying wheels and in longitudinal alinement with the wheels of the shaft 52.

The four tread chain wheels are substantially alike, and the description of one will suffice for all. The structure of the tread chain carrying wheels is illustrated in Fig. 8, each wheel comprising a two part sleeve hub 54 and 55 enlarged at their outer ends to receive obliquely faced roller bearing bands 56 and 57 while the shafts 52 and 53 are provided with opposing bearing bands 58 and 59 having their operating faces obliquely faced reversely to the faces of the bands 56 and 57.

Antifriction rollers 60 and 61 are disposed respectively between the bands 56 and 58 and 57 and 59 as shown. By this means the tread chain wheels are mounted upon the shafts by effectual roller bearings.

The body portions of the tread chain wheels consist of outer webs or disks 62 and 63 and inner webs or disks 64 and 65. The enlarged outer ends of the hub members 54 and 55 are provided with outwardly directed annular flanges 66 and 67 to which the outer webs 62 and 63 are riveted or otherwise secured, while the confronting ends of the hub sections are formed with similar flanges 68 and 69 to which the inner webs 64 and 65 are riveted or otherwise attached. By this means the hub members and the webs are rigidly connected.

At their outer edges the outer webs 62 and 63 are directed outwardly at reverse angles, as shown at 70 and 71.

The inner webs 64 and 65 of one of the chain tread wheels are formed with intermediate lateral offsets 72 and 73 to form annular bearing shoulders to support a ring chain wheel 74, the ring gear being riveted or otherwise attached to the disks. At their outer edges the inner webs 64 and 65 are outwardly offset as shown at 75 and 76 and the offsets depressed to form annular channels surrounding each wheel, and with the outer portion of each offset riveted or otherwise secured to the offsets 70 and 71 of the outer webs 62 and 63.

The inner webs 64 and 65 where they contact are riveted or otherwise connected.

The body webs of the tread carrying wheels are each pressed from a single plate of metal, preferably steel, and when coupled together and to the hub members forms a very strong compact wheel, and which can be manufactured at comparatively small expense.

Engaging the shaft 52 between the side members 20 and 21 and the tread chain wheels are collars 77 and 78 from which pull rods 79 and 80 extend through the adjacent end of the frame, and are thence extended through a head member 81 in which they are held by adjusting screws 82 and 83.

A plurality of springs 84 are disposed between the head member 81 and the end of the frame, and exert their force to maintain the shaft 52 and the chain wheels carried thereby in strained relation and enabling the shaft and its wheel to be adjusted to any required extent within the range of the slots 50.

A guard cap 85 is connected to the frame members 20 and 21, to extend over the member 81 and the springs 84 to protect them.

The shaft 53 may preferably be provided with suitable adjusting screws 86 as shown, if required.

Engaging around each coacting set of the channeled wheels is an endless chain carrying ground engaging blocks or lugs, the construction of the chain being shown in Figs. 9—10—11. The links of the chains are wide enough to bridge over both of the tread chain carrying wheels and each includes a web or body portion 86 having a tongue 87 at one end and a socket 88 at the other end, the tongues and sockets interengaging when the links are disposed end to end.

At their sides each link is formed with projecting V-shaped lugs 89 and 90 to engage in the V-shaped channels of the wheels, and with interengaging hinge formed perforated ears 91 and 92, united by pintles.

The outer face of each link is provided with a tread member 95 of rubber or other suitable material, the tread portions corresponding in size to the whole body of the link including the part from which the lugs extend, and secured to the link by rivets or the like.

The rearmost tread chain carrying wheel is provided with mudribs or cleats 96 to engage between the terminals of the lugs 89 and 90, and thus insure the movement of the chain when the wheels are positively rotated by power applied to the chain running over the chain wheels 37 and 74, as hereafter explained.

A brake drum 96 is attached to hub 25, the brake mechanism not being shown as it forms no part of the present invention.

A transverse strut or stay a portion of which is represented at 97 connects each opposite pair of the frame members 21, and the stay member is coupled to the axle casing by oblique braces, one of which is shown at 98, and pivotally coupled at its ends respectively to the members 15 and 97, as shown.

The members 32 are each provided with spaced perforated ears 99 to receive holding pins 100 and supported upon the holding pins are standards 101, in spaced relation at each side of the central line of the tread chain. Mounted to swing upon a pin 102 extending through the standards 101 are carrier plates 103, and mounted to swing upon pins 104 extending through the carrier plates at their ends are link devices 105. The link devices are provided at their ends with axles or journals 106 which carry chain engaging rollers 107, the plates 103 being curved upwardly to avoid the contiguous axles 106.

The flat intermediate webs 86 of the tread chains move consecutively beneath the bearing rollers 107, and are thus held in constant contact with the ground between the larger chain carrying wheels.

Disposed between the standards 101 of the frames 20 and 21, and the swinging plates 103 are compression springs 111, to retain the members 103 and their connections yieldably in position, and prevent the lower portion of the chain from being moved upwardly by pressure of the ground.

Attached to the frame members 20 and 21 are upwardly directed frames or standards 112 carrying chain engaging rollers 113, to support the chain and prevent sagging.

The preferred embodiment of the invention is disclosed in the drawings and set forth in the specifications, but it will be understood that any modifications within the scope of the claims may be made in the construction without departing from the principle of the invention or sacrificing any of its advantages.

I claim:

1. In an apparatus of the class described including an axle and an axle housing, a support depending from said housing and having a segmental socket, a frame having a segmental track extending upwardly therefrom intermediate the ends and engaging in said socket, tread chain wheels mounted for rotation in said frame at opposite sides of said axle, a tread chain including ground engaging lugs operating around said tread chain wheels, and means for transmitting the motion of said axle to said tread chain wheels.

2. In an apparatus of the class described including an axle and an axle housing, a support depending from said housing and having a segmental socket, a supporting frame including spaced sides, one of the sides being directed downwardly and having a segmental track intermediate the ends engaging said socket, whereby the frame is adapted to swing relatively to said axle, tread chain wheels arranged in pairs and mounted for rotation in said frame at opposite sides of said axle, a tread chain including ground engaging lugs operating around said tread chain wheel and bridging the same, a drive chain wheel carried by said axle, a drive chain wheel between one pair of said tread chain wheels, and a drive chain operating over said drive chain wheels and within the lines of the tread chain.

3. In an apparatus of the class described, an axle, a supporting frame including spaced side member and swinging relatively to said axle, shafts carried by said frame members at opposite sides of said axle, tread chain wheels carried by said shafts and each including a two part hub engaging end to end, outer webs connected to the outer ends of said hub members, inner webs connected to the confronting ends of said hub members, and having lateral channeled offsets at their peripheries, outer webs engaging the outer ends of said hub members and having lateral offsets bearing against and supporting the channeled portion of the inner web, tread chains operating in said channels, and means for transmitting the motion of said axle to said tread chain wheels.

In testimony whereof I affix my signature hereto.

HAROLD N. PALMER.